United States Patent [19]

Silva

[11] Patent Number: 4,879,813

[45] Date of Patent: Nov. 14, 1989

[54] APPARATUS FOR INSPECTING TWIST DRILLS

[76] Inventor: Jeffrey T. Silva, 4616 Exeter St., Annandale, Va. 22003

[21] Appl. No.: 179,317

[22] Filed: Apr. 8, 1988

[51] Int. Cl.$^4$ ............................................. G01B 5/20
[52] U.S. Cl. ...................................... 33/201; 408/16
[58] Field of Search ...................... 408/16, 76, 97, 98, 408/104, 107, 103, 16, 72; 33/201, 533, 550, 645; 51/105 EC, 219 R, 220

[56] References Cited

U.S. PATENT DOCUMENTS

| | | | |
|---|---|---|---|
| 464,290 | 1/1981 | Taylor | 33/201 |
| 607,306 | 7/1988 | Walker | 51/219 R |
| 758,372 | 4/1904 | Marsh | 51/274 |
| 1,020,860 | 3/1912 | Vauclain | 51/219 R |
| 2,079,266 | 2/1936 | Vaver | 33/233 |

FOREIGN PATENT DOCUMENTS 1318821  11/1962  France ................................ 408/115

*Primary Examiner*—Z. R. Bilinsky
*Assistant Examiner*—Robert Schultz
*Attorney, Agent, or Firm*—Dressler, Goldsmith, Shore, Sutker & Milnamow, Ltd.

[57] ABSTRACT

An apparatus is disclosed for inspecting the cutting features of twist drills to determine the concentricity of the drill's chisel ridge and the symmetrical status of the outer corners of the drill's flutes. The apparatus comprises an upstanding V-shaped block defining first and second legs having flat inner surfaces positioned at a right angle to one another, the legs having flat upper and lower surfaces which parallel one another and which are at a right angle to the inner surfaces of the block. The second leg is wide enough to stably support a reference plate slidably mounted in a channel formed in the leg. The reference plate has a longitudinally extending slot therein, and threaded means connected to the channel to releasably fix the reference plate in the channel. The forward end of the reference plate terminates in an edge which parallels the inner surface of the second leg, and is preferably beveled downwardly to provide a reference line at the undersurface of the plate.

6 Claims, 1 Drawing Sheet

APPARATUS FOR INSPECTING TWIST DRILLS

TECHNICAL FIELD

This application relates to an apparatus for assisting a machinist in visually inspecting the cutting features of twist drills to ascertain whether the drill is properly sharpened.

BACKGROUND OF THE INVENTION

Drills have been used for many hundreds of years and the cutting edges of these drills have always required sharpening. The sharpened edges must be inspected to insure the concentricity of the drills' chisel ridge and the symmetry of the outer corners of the cutting edges. This initial inspection has been carried out by simply "eyeballing" the sharpened drill. However, if the drill was improperly sharpened at the factory or was found to be dull from previous use, the drill must be resharpened if the user wishes the drill to cut a round hole within a desired tolerance, or possibly even penetrate the material he is required to cut.

As may be expected, this initial inspection is not precise, and, though more thorough methods for inspecting drills exist, their complexity of design makes them expensive to buy and maintain as well as time consuming to operate. Accordingly, this invention provides a simple and easy to use tool for those machinists who must frequently sharpen and inspect the cutting features of a twist drill.

DISCLOSURE OF THE INVENTION

This invention relates to apparatus for inspecting the cutting features of twist drills. More particularly, it is intended to observe and thus determine the concentricity of the drill's chisel ridge and the symmetrical status of the cutting edges which terminate at the outer corners of the drill's flutes. This inspecting apparatus comprises an upstanding V-shaped block defining first and second legs having flat inner surfaces positioned at a right angle to one another. These legs have flat upper and lower surfaces which parallel one another and which are at a right angle to the inner surfaces of the legs. The second leg is normally longer than the first leg and has sufficient width to stably support a slidably mounted reference plate. This reference plate has a length which is longer than the width of the second leg, and the upper surface of the second leg is formed with a channel paralleling the first leg to slidably receive the reference plate for longitudinal movement in the channel. The reference plate is formed to include a longitudinally extending slot therein, and the plate is threadly connected to the channel to releasably fix the reference plate in the channel. One edge of the channel is preferably a continuation of the inner surface of the first leg and the inner end of the reference plate terminates in an edge which parallels the inner surface of the second leg.

The invention will be more fully understood in the light of the accompanying drawing which shows an illustrative structure in accordance with this invention. In these drawings.

Referring more particularly to the drawings, the apparatus for inspecting the cutting features of twist drills includes an upstanding V-shaped block 10, normally made of machined steel, defining first and second legs 12 and 14. These legs have flat inner surfaces 20 and 22 positioned at a right angle to one another. Surfaces 20 and 22 intersect to form the line 13, and the lengths of these legs is measured from line 13.

Figure 4:
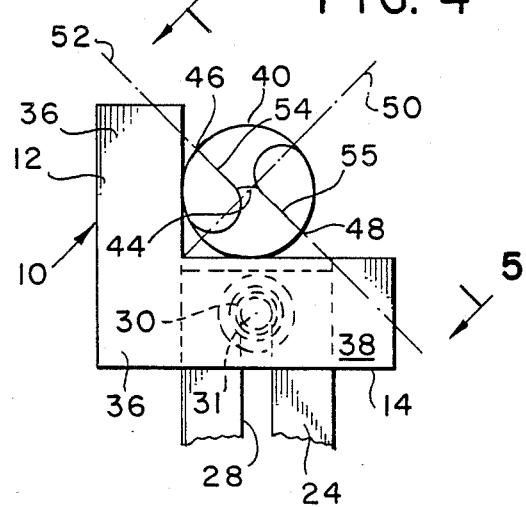
FIG. 4 is a second plan view with the drill in place for the second step of inspection.

Legs 12 and 14 have flat upper surfaces 16 and 18 and, as shown in FIG. 4, flat lower surfaces 36 and 38. Upper surfaces 16 and 18 are parallel to the lower surfaces 36 and 38, respectively, and these several surfaces are all at a right angle to the inner surfaces 20 and 22.

The second leg 14 is longer than the first leg 12 and has sufficient width to stably support a slidably mounted reference plate 24. The width of leg 14 is preferably greater than that of leg 12 to ensure a stable support for plate 24. Reference plate 24 has a length which is longer than the width of leg 14, and is preferably long enough to extend to the end of leg 12.

The upper surface of leg 14 is formed with a channel 26 which parallels leg 12 to slidably receive reference plate 24. Reference plate 24 is formed with a longitudinally extending slot 28, and threaded means, such as a thumb screw 30, extends through the slot 28 into a threaded hole 31 in the bottom of channel 26. Operation of thumb screw 30 releasably fixes reference plate 24 at a desired position with respect to the channel 26. Washer 29 is included beneath the enlarged head of screw 30.

The inner edge 32 of channel 26 is a continuation of the inner surface 20 of first leg 12. Reference plate 24 terminates at its forward end 34 in an edge which parallels the inner surface 22 of the second leg 14. It is preferred that the end 34 of reference plate 24 be beveled downwardly forming a wedge, as shown, to provide a reference line 35 at the undersurface of the plate.

Preferably, reference plate 24 has a length which is the same as the length of the upper surface 16. Slot 28 is long enough to permit reference plate 24 to be moved into a retracted position in which the edge 35 overlies channel 26 to leave the interior of the V-shaped block 10 unobstructed. Preferably, slot 28 also enables plate 24 to be projected to a forward position in which edge 35 meets the end 36 of leg 12.

The drill inspecting apparatus of this invention is used after the drill has been sharpened to ensure that the chisel ridge and the cutting surfaces are correctly positioned at the bit end of the drill. The drill is inspected in two steps.

Figure 1:
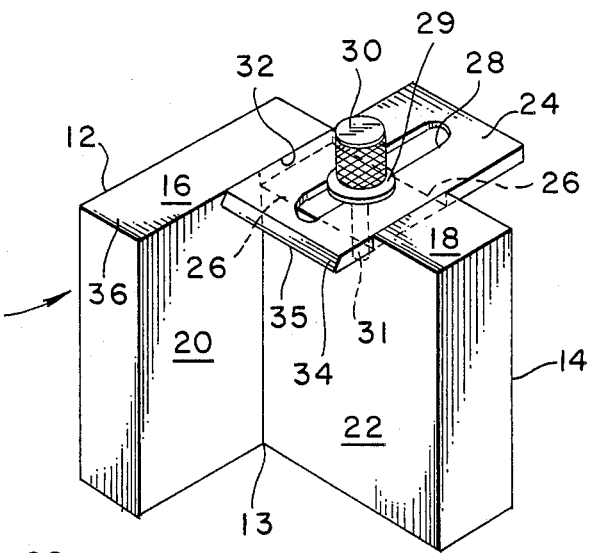
FIG. 1 is a perspective view of an illustrative apparatus in accordance with this invention.
Figure 2:
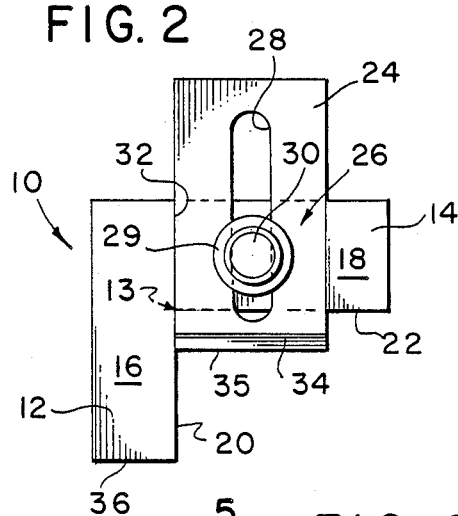
FIG. 2 is a plan view of the apparatus shown in FIG. 1.
Figure 3:
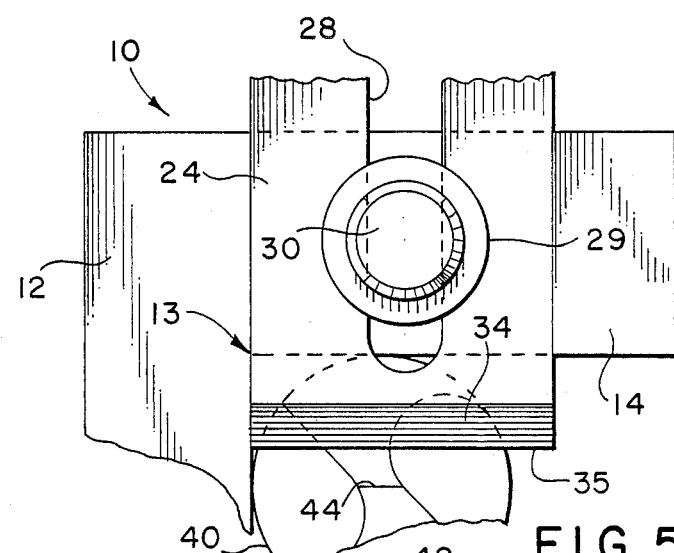
FIG. 3 is an elevation of the apparatus illustrating a drill in position for the first inspection step.

The first step is to check the position of the chisel ridge to determine whether this ridge is centered in relationship to the drill's axis. To do this, the drill 40 is placed in the V-shaped block as shown in FIG. 3 and pressed toward line 13. The drill is then moved axially so that its bit end 42 is just below the plane of channel 26 in the upper surface of leg 14. While holding the drill with the thumb against line 13, and viewing directly down upon the upper surfaces of the apparatus, the drill 40 is rotated with the thumb until the chisel ridge 44 is parallel to edge 35 of reference plate 24. Reference plate 24 is then extended forwardly until its edge 35 is directly over the chisel ridge 44. Screw 30 is then tightened to lock reference plate 24 in position.

With reference plate 24 locked in place, drill 40 is rotated 180 degrees. The chisel ridge 44 should still be directly beneath the edge 35 of reference plate 24. If the chisel ridge 44 is not directly beneath edge 35 after the described 180-degree rotation, as pictured in FIG. 3, the chisel ridge is not correctly centered, and corrective action is needed. More particularly, the side of the drill to which the ridge is closest (the short side) must be ground to center the ridge with respect to the axis of the drill. After each regrinding, reference plate 24 should be reset, as described, and drill 40 inspected again, until one is satisfied with the result.

The second step in the inspection process is the inspection of the drill's outer corners to ensure that they have the same level along the axis of the drill.

As shown in FIG. 4, reference plate 24 has been retracted so that the interior of block 10 is unobstructed and drill 40 is reversed relative to block 10 so that the bit end 42 faces the lower ends 36 and 38 of block 10.

The outer corners 46 and 48 of drill bit 42 are formed by the cutting edges of the flutes 54 and 55 at the points where the cutting edges meet the circumference of drill bit end 42. These outer corners 46 and 48 must be symmetrical; i.e., directly across from one another (180 degrees apart) and on precisely the same plane which is at a right angle to the axis of the drill.

To inspect the cutting edges, drill 40 is again placed in the V-shaped block (reversely positioned as previously noted) and pressed against line 13. The drill is then moved axially so that its outer corners 46 and 48 are at about the level of surfaces 36 and 38. While holding drill 40 with the thumb and looking down at the bit end 42, the drill is rotated until outer corners 46 and 48 are perpendicular to the bisector of the V as shown in FIG. 4. The bisecting plane is identified at 50, and the right angle disposition of corners 46 and 48 with respect to plane 50 is shown at 52. In this position, chisel ridge 44 will tend to be parallel to one of legs 12 and 14 and perpendicular to the other, again as shown in FIG. 4.

Figure 5:
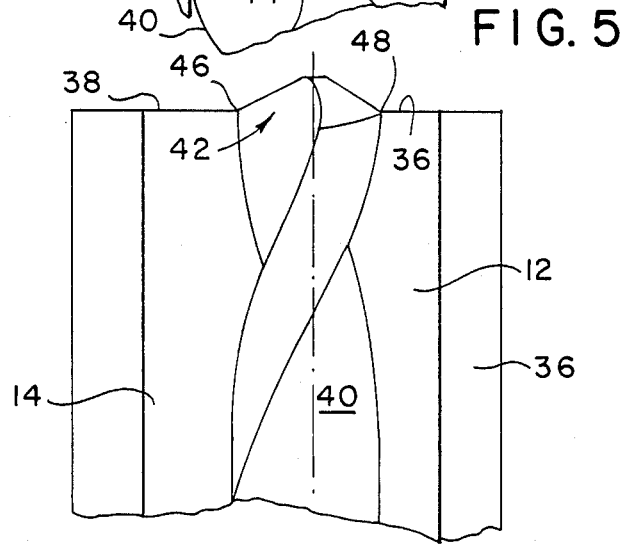
FIG. 5 is an elevation taken on the line 5—5 of FIG. 4 and showing the second inspection operation.

As shown in FIG. 5, the apparatus should now positioned so that the user is looking directly across ends 36 and 38 of legs 12 and 14. If the outer corners 46 and 48 are symmetrical, they will both be on the same plane as the surfaces 36 and 38 of the V-shaped block 10. This is determined by sighting along bisecting plane 50 with block 10 held at eye level and the drill positioned as described above. If outer corners 46 and 48 are not both on the same plane as surfaces 36 and 38, the higher surface must be ground down carefully so that the chisel ridge is not disturbed. The inspection step described above is repeated after every grinding operation until both outer corners 46 and 48 are on a plane with surfaces 36 and 38.

While, in accordance with the provisions of the Patent Statutes, the preferred embodiment of the invention has been illustrated and described, it will be apparent to those skilled in the art that changes may be made without deviating from the inventive concepts set forth above.

What is claimed is:

1. An apparatus for determining the concentricity of the chisel ridge and the symmetry of the outer corners of the said apparatus, cutting edges of the point of a twist drill comprising an upstanding V-shaped blocked defining first and second legs having flat inner surfaces positioned at a right angle to one another, said legs having flat upper and lower surfaces which parallel one another and which are at a right angle to said inner surfaces, said upper services lying in a common plane, a reference plate having a forward end and a length which is longer than the width of said second leg, the upper surface of said second leg being formed with a channel paralleling said first leg to slidably receive said reference plate, said reference plate having a longitudinally extending slot therein, and threaded means connected to said channel and received in said longitudinally extending slot to releasably fix said reference plate in said channel, and the forward end of said reference plate terminating in a wedge having a tip which parallels the inner surface of said second leg.

2. An apparatus in accordance with claim 1 in which said channel has an edge that is a continuation of the inner surface of said first leg.

3. An apparatus in accordance with claim 1 in which said second leg is longer than said first leg and has a width which is greater than the width of said first leg.

4. An apparatus in accordance with claim 1 in which said reference plate is long enough to extend to the end of said first leg when said reference plate is projected.

5. An apparatus in accordance with claim 1 in which said reference plate wedge is beveled downwardly from a top face of said reference plate to form said tip which provides a reference line at a bottom face reference of said plate.

6. An apparatus in accordance with claim 3 in which said longitudinally extending slot is long enough to permit said reference plate to be moved into a retracted position in which said wedge overlies said channel to leave the interior of said V-shaped block unobstructed and to permit said reference plate to be moved into a projected position in which said reference plate extends the entire length of said first leg.

* * * * *